(12) United States Patent
Weidinger

(10) Patent No.: US 9,956,620 B2
(45) Date of Patent: May 1, 2018

(54) READJUSTMENT SYSTEM

(75) Inventor: Franz Weidinger, Vienna (AT)

(73) Assignee: Mauser-Werke Oberndorf Maschinenbau GmbH, Oberndorf (DE)

( * ) Notice: Subject to any disclaimer, the term of this patent is extended or adjusted under 35 U.S.C. 154(b) by 0 days. days.

(21) Appl. No.: 14/128,032

(22) PCT Filed: Jul. 17, 2012

(86) PCT No.: PCT/EP2012/064006
§ 371 (c)(1),
(2), (4) Date: Dec. 20, 2013

(87) PCT Pub. No.: WO2013/011027
PCT Pub. Date: Jan. 24, 2013

(65) Prior Publication Data
US 2014/0133930 A1 May 15, 2014

(30) Foreign Application Priority Data
Jul. 19, 2011 (DE) .................. 10 2011 051 958

(51) Int. Cl.
*B23B 29/034* (2006.01)
*B23G 5/04* (2006.01)

(52) U.S. Cl.
CPC ...... *B23B 29/034* (2013.01); *B23B 29/03489* (2013.01); *B23G 5/04* (2013.01); *B23B 29/03432* (2013.01); *B23B 2260/108* (2013.01); *Y10T 408/85* (2015.01)

(58) Field of Classification Search
CPC ..... Y10T 82/12; Y10T 82/122; Y10T 82/125; Y10T 82/128; Y10T 82/2512; B23B 29/034; B23B 29/03; B23B 29/03417; B23B 29/03421; B23B 29/03489; B23B 29/125; B23B 37/00; B23B 2260/108; B23B 29/03432
See application file for complete search history.

(56) References Cited

U.S. PATENT DOCUMENTS

| | | | | |
|---|---|---|---|---|
| 2,295,135 A | * | 9/1942 | Smith | 82/1.5 |
| 2,661,640 A | * | 12/1953 | Ruegg | 82/1.3 |
| 2,771,798 A | * | 11/1956 | De Vileg | 82/1.2 |
| 3,492,894 A | | 2/1970 | Han et al. | |
| 3,710,659 A | * | 1/1973 | Pagella et al. | 82/1.2 |
| 3,813,969 A | * | 6/1974 | Wheeler | 82/19 |
| 3,822,618 A | * | 7/1974 | Tomenceak | 82/18 |
| 4,215,603 A | * | 8/1980 | Jones | 82/1.3 |
| 4,746,252 A | * | 5/1988 | Jesinger | 409/233 |
| 5,001,382 A | * | 3/1991 | Umeda et al. | 310/328 |
| 5,140,773 A | * | 8/1992 | Miwa et al. | 451/41 |
| 5,344,260 A | * | 9/1994 | Suzuki et al. | 408/168 |
| 5,640,063 A | * | 6/1997 | Zumeris et al. | 310/328 |

(Continued)

FOREIGN PATENT DOCUMENTS

CN 201889551 7/2011
CN 204262387 U * 4/2015 .......... B23B 29/034

(Continued)

*Primary Examiner* — Daniel Howell
(74) *Attorney, Agent, or Firm* — Boyle Fredrickson S.C.

(57) ABSTRACT

The invention relates to a readjustment system that comprises an advancing head, wherein a tool can be moved in an advancing direction by a tool slide which is adjusted by means of at least one piezo actuator.

13 Claims, 3 Drawing Sheets

(56) References Cited

U.S. PATENT DOCUMENTS

| | | | |
|---|---|---|---|
| 5,714,833 A * | 2/1998 | Zumeris | 310/328 |
| 6,128,985 A * | 10/2000 | Muster et al. | 82/1.4 |
| 6,384,514 B1 * | 5/2002 | Slutskiy et al. | 310/323.17 |
| 6,455,983 B2 * | 9/2002 | Dettmann et al. | 310/328 |
| 6,464,202 B1 * | 10/2002 | Boecking | 251/129.06 |
| 6,586,862 B1 * | 7/2003 | Cselle | 310/328 |
| 6,979,936 B1 * | 12/2005 | Ganor et al. | 310/328 |
| 7,129,620 B2 * | 10/2006 | Sakano et al. | 310/323.09 |
| 7,140,819 B2 * | 11/2006 | Broghammer et al. | 409/234 |
| 7,175,506 B2 * | 2/2007 | Fiebelkorn et al. | 451/11 |
| 7,557,456 B2 * | 7/2009 | Kornbluh et al. | 290/42 |
| 7,645,246 B2 * | 1/2010 | Rastegar et al. | 601/5 |
| 7,675,253 B2 * | 3/2010 | Dorel | 318/118 |
| 7,692,365 B2 * | 4/2010 | Churchill et al. | 310/339 |
| 7,737,604 B2 * | 6/2010 | Adachi et al. | 310/317 |
| 7,851,972 B2 * | 12/2010 | Takasan et al. | 310/323.04 |
| 8,094,391 B2 * | 1/2012 | Fujiwara et al. | 359/824 |
| 8,183,744 B2 * | 5/2012 | Petrenko et al. | 310/323.16 |
| 8,228,624 B2 * | 7/2012 | Kanda et al. | 359/824 |
| 8,269,948 B2 * | 9/2012 | Bleidistel et al. | 355/67 |
| 8,344,526 B2 * | 1/2013 | Bhat et al. | 290/1 R |
| 8,350,394 B2 * | 1/2013 | Cottone et al. | 290/1 R |
| 8,350,447 B2 * | 1/2013 | Jungnickel et al. | 310/323.02 |
| 8,378,532 B2 * | 2/2013 | Laufenberg | 310/26 |
| 8,410,667 B2 * | 4/2013 | Rastegar et al. | 310/339 |
| 8,410,671 B2 * | 4/2013 | Adachi | 310/366 |
| 8,471,432 B2 * | 6/2013 | Prajapati et al. | 310/300 |
| 8,531,091 B2 * | 9/2013 | Yoshida et al. | 310/356 |
| 8,760,037 B2 * | 6/2014 | Eshed et al. | 310/323.09 |
| 8,796,906 B2 * | 8/2014 | Nishimura | 310/323.09 |
| 8,827,428 B2 * | 9/2014 | Miyazawa et al. | 347/68 |
| 8,866,316 B2 * | 10/2014 | Wood et al. | 290/1 R |
| 8,890,376 B2 * | 11/2014 | Nair et al. | 310/26 |
| 8,979,065 B2 * | 3/2015 | Zhelyaskov et al. | 251/129.06 |
| 2005/0134149 A1 * | 6/2005 | Deng et al. | 310/339 |
| 2007/0070235 A1 * | 3/2007 | Maejima et al. | 348/335 |
| 2009/0225297 A1 * | 9/2009 | Bleidistel | G02B 7/023 355/67 |
| 2012/0204674 A1 * | 8/2012 | Lundberg et al. | 74/640 |
| 2013/0140954 A1 * | 6/2013 | Kamijo et al. | 310/330 |
| 2014/0001920 A1 * | 1/2014 | Auer et al. | 310/317 |
| 2014/0050543 A1 * | 2/2014 | Steppan et al. | 408/1 R |
| 2014/0077660 A1 * | 3/2014 | Knight | 310/328 |
| 2015/0200612 A1 * | 7/2015 | Matsukawa et al. | H02N 2/14 |

FOREIGN PATENT DOCUMENTS

| | | | | |
|---|---|---|---|---|
| DE | 2419028 A | * | 11/1974 | B23B 29/034 |
| DE | 3926026 A | * | 2/1991 | B23B 29/034 |
| DE | 287885 A | * | 3/1991 | B23B 29/03 |
| DE | 4015509 C | * | 7/1991 | B23B 29/034 |
| DE | 44 01 496 | | 8/1995 | |
| DE | 10 2010 013480 | | 4/2001 | |
| DE | 10338850 A1 | * | 3/2004 | B23B 31/40 |
| DE | 103 45 993 | | 5/2005 | |
| DE | 10 2007 017 800 | | 10/2007 | |
| DE | 102013111941 A1 | * | 4/2015 | B23B 31/00 |
| DE | 102015216531 A1 | * | 3/2017 | B23Q 1/26 |
| EP | 673710 A1 | * | 9/1995 | B23B 29/034 |
| JP | 2011104700 A | * | 6/2011 | B23Q 17/22 |
| JP | 2012081572 A | * | 4/2012 | B23B 29/034 |
| JP | 3195090 U | * | 12/2014 | B28D 1/14 |
| JP | 2014223797 A | * | 12/2014 | B28D 1/14 |
| RU | 2553758 C1 | * | 6/2015 | B23B 29/034 |
| SU | 592526 A | * | 2/1978 | B23B 29/03 |
| SU | 997993 A | * | 2/1983 | B23B 29/03 |
| WO | WO 2005063447 A1 | * | 7/2005 | B25B 1/06 |
| WO | WO 2010146953 A1 | * | 12/2010 | B23B 29/034 |
| WO | WO 2013142890 A1 | * | 10/2013 | B23B 29/12 |
| WO | WO 2014017460 A1 | * | 1/2014 | B23B 37/00 |

* cited by examiner

READJUSTMENT SYSTEM

BACKGROUND OF THE INVENTION

Field of the Invention

The invention relates to a readjustment system in accordance with the preamble of claim 1.

Description of Related Art

Readjustment systems of this type are used, for example, for readjustment in the case of wear of the tool or in the case of precision finishing of inner and outer contours of workpieces, wherein said contours can have a cylindrical, eccentric or out-of-round shape.

DE 10 2007 017 800 A1 discloses a readjustment system in which a spindle supports a membrane tilting head by which a cutting edge is adjustable in the radial direction so as to impart a round, oval and/or trumpet shape in the longitudinal axis of the piston bolt or any other suited shape to a small connecting rod eye, for example. The membrane tilting head is adjusted via, a linearly adjustable actuator, also referred to as tie rod, via which a tool head supporting the cutting edge and being operatively connected to a membrane can be tilted with respect to the spindle axis so as to bring about radial adjustment. The tie rod is supported in the spindle and co-rotates with the same. A rear end portion of the tie rod is guided out of the spindle and is supported there via a bearing arrangement on a slide adjustable via an actuator. In the known solutions the spindle is driven via a drive motor which is arranged in parallel to the spindle axle and is operatively connected to the spindle via a belt drive or the like. For precision finishing of bores the adjusting means has to be configured so that diameter tolerances ≤IT6 can be observed. The roundness, cylindrical shape or straightness of the surfaces to be machined has to reach values up to a maximum of 3μ. Moreover, it must be possible to produce profile shapes and/or defined ovality within the range of few μ.

It is a drawback of said solutions that considerable construction space and efforts in terms of apparatuses are required for the spindle drive and also the bearing of the tie rod. Another drawback consists in the heat transmission through the tie rod.

In DE 44 01 496 C3 an adjusting means for machining round, out-of-round and/or non-cylindrical contours is described in which the adjustment of the cutting edge is performed via a head including piezoelectric translators. In the known readjustment system the head is approximately U-shaped, the piezoelectric actuator being arranged in a fixed leg of the U-shaped head and acting on an elastically deflectable leg at which the cutting edge is retained. By deforming the piezoelectric actuators the elastically deflectable leg and thus the cutting edge can be adjusted in the radial direction. It is a drawback of this solution that the tool holder has to be configured to exhibit elasticity so that especially in the case of high cutting efficiency the quality required for precision finishing cannot be ensured. It is another drawback that the U-shaped tool holder requires considerable construction space. Furthermore it is detrimental that due to the U-shaped tool head an imbalance by which the machining accuracy can be further deteriorated is produced upon readjustment or actuation.

SUMMARY OF THE INVENTION

On the other hand, the object underlying the invention is to provide a readjustment system suited for precision finishing which excels by optimum rigidity and minimum imbalance.

This object is achieved by a readjustment system comprising the features of claim 1.

Advantageous further developments of the invention are the subject matter of the subclaims.

The readjustment system according to the invention comprises an advancing head supporting a cutting edge and being configured to have a piezoelectric actuator for radially adjusting the cutting edge. The advancing head includes a tool slide displaceable and, resp., adjustable in the radial direction as advancing direction which is operatively connected to the cutting edge and which is movable via the piezoelectric actuator, hereinafter referred to as piezo actuator, in the advancing direction along a guideway.

By guiding the tool slide the adjusting movement of the piezo actuator is converted most exactly into an advancing movement, wherein inaccuracies resulting from a deflection of component parts of the advancing head required in prior art can be avoided. The arrangement according to the invention having a tool slide adjusted by a piezo actuator excels by optimum rigidity, wherein very exact adjustment is possible due to the precise guiding. Such design furthermore permits arranging the tool slide most largely symmetrically with respect to the axis of rotation of the spindle so that the imbalances that are inevitable in the prior art described in the beginning are minimized. The effective direction of the piezo actuators in this case preferably extends in the advancing direction.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE PREFERRED EMBODIMENTS

In an embodiment of the invention the tool slide is biased via a counterforce element in the direction of a home position. The piezo actuator then counteracts said biasing.

The structure of the readjustment system is especially simple if the counterforce element is formed by a spring or a spring assembly.

Said counterforce element, such as a spring assembly, can be arranged in parallel to the piezo actuator, for example, so that the readjustment system has a very compact design.

In order to increase the adjusting travel and/or the adjusting force, plural piezo actuators can be arranged in parallel or in series to each other so that the adjusting travels of the individual piezo actuators or the adjusting forces applied by the individual piezo actuators are added up.

In a preferred embodiment of the invention, two units including at least two piezo actuators arranged mechanically in series, are arranged in parallel to each other.

It is preferred in this variant when the counterforce element is arranged in a plane of symmetry between the two piezo actuator units.

The readjustment system has an especially simple and compact design when the guideway for the tool slide is delimited, on the one hand, by a support of the counterforce element and, on the other hand, by a support for the piezo actuator(s) so that said supports also delimit the adjusting travel of the tool slide.

In order to minimize soiling by chips, coolant/lubricant or the like, the guideway is separated against the working chamber by a cover.

In an embodiment of the invention the advancing head of the readjustment system is designed to include a HSK (hollow shank taper) clamping system for clamping a tool configured to include the cutting edge.

Preferred embodiments of the invention will be illustrated in detail hereinafter by way of schematic drawings, in which:

DETAILED DESCRIPTION OF THE DRAWINGS

Figure 1:
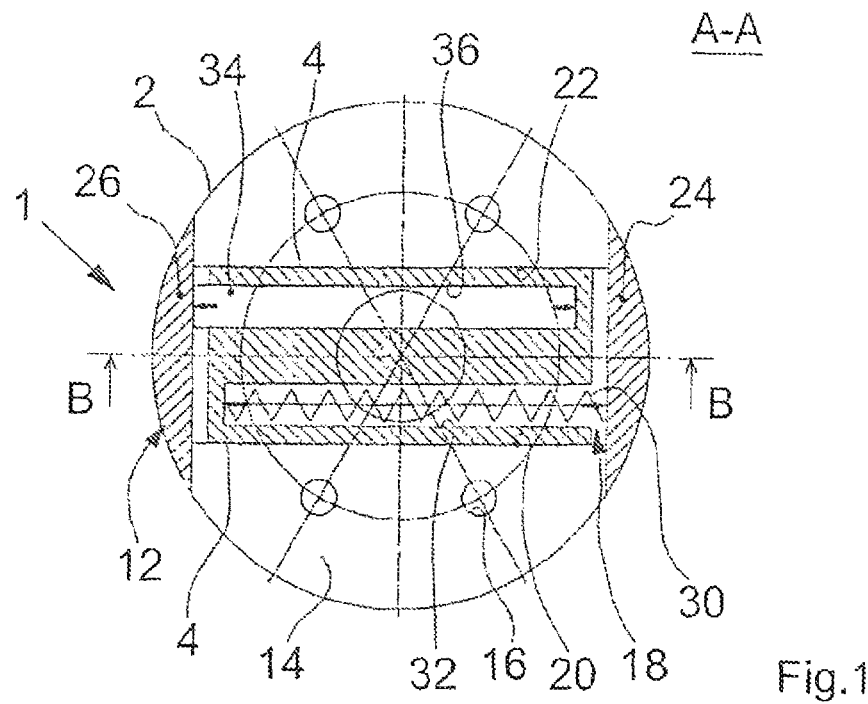
FIG. 1 shows a strongly schematized diagonal section of a first embodiment of a readjustment system.
Figure 2:
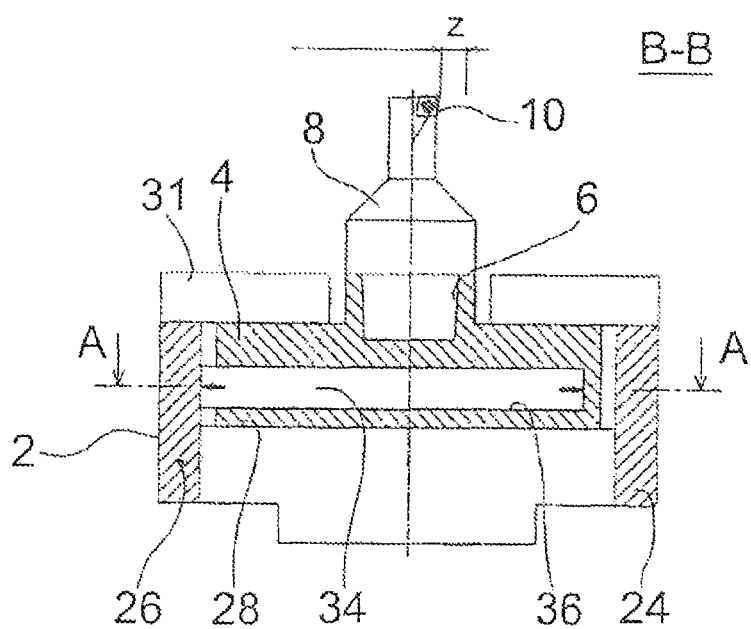
FIG. 2 shows a longitudinal section across the readjustment system according to FIG. 1.

In FIGS. 1 and 2 sections A-A and B-B of a readjustment system 1 according to the invention are shown. The readjustment system is mounted to a motor spindle of a machine tool or a machining unit. The readjustment system 1 comprises an advancing head 2 in which a tool slide 4 is movably guided in the adjusting direction. The latter includes a tool holder 6 into which a tool 8 can be inserted by means of a HSK (hollow shank taper) clamping system, for example.

In the shown embodiment the tool 8 supports a cutting edge 10 protruding in the radial direction which is adjustable by the shown measure Z by appropriate displacement of the tool slide 4 in the radial direction (view according to FIG. 2). The structure of the clamping system, the tool holder 6 and the tool 8 is known from prior art so that more detailed explanations can be dispensed with.

The advancing head 2 includes a structure 12 in which the tool slide 4 is adjustable in the radial direction (vertical in FIGS. 1 and 2). For mounting on the tool spindle not shown in FIGS. 1 and 2 the structure 12 is configured to have a mounting flange 14 in which mounting bores 16 are formed the hole layout and round centering of which correspond to that of an acceptance of the tool spindle not shown so that the structure 12 can be arranged at the tool spindle. In the structure 12 a parallel guideway 18 for the tool slide 4 is formed for guiding the latter in the adjusting direction Z. The guideway 18 substantially comprises two lateral guideways 20, 22 extending in parallel to the adjusting direction Z. The displacement is delimited by two supporting components 24, 26 against which the tool slide 4 abuts at its respective end position. In parallel to the plane of projection in FIG. 1, the tool slide 4 is guided on a support 28 of the structure 12 and is covered in the direction of the working space, i.e. toward the cutting edge 10, by means of a cover 31 that primarily serves as a guideway and moreover prevents chips and/or coolant/lubricant or other impurities from entering into the guiding area. The cover 31 is preferably connected to the tool slide 4.

In accordance with FIG. 1 illustrating a section along the line A-A in FIG. 2, the tool slide 4 is biased in the direction of the (in FIGS. 1 and 2) left supporting component 26 via a counterforce element in the form of a spring 30 or a spring assembly. This spring 30 is supported on the (in FIGS. 1 and 2) right supporting component 24 and with its free end portion immerses into a holding space 32 of the tool slide 4 and is adjacent to au end face of said holding space 32 so as to bias the tool slide 4 in the said direction toward the supporting component 26. The latter supports a piezo actuator 34 which in turn immerses into a piezoelectric acceptance 36 of the tool slide 4. Such piezoelectrically driven actuators have a particular expansion and retraction travel and are connected to the appropriate control of the machine tool or the machining unit, wherein synchronization with the associated axis, for example the Z axis, and the speed of the tool spindle can be performed. The piezo actuators 34 are primarily driven during rotation of the tool spindle via the machine control so as to exploit the adjusting/actuating range. The function of said piezo actuators is known from the prior art described in the beginning so that in this respect, too, further explanations are dispensable. What is important is the fact that such piezoelectric elements are deformable when electric voltage is applied so that adjustment is effectuated via such variation of the shape. In this case, due to the system compression forces in accordance with an expansion of the piezo actuator 34 in the representation according to FIG. 1 that are higher than tensile forces (in accordance with a shortening of the piezo actuator 34 in FIG. 1) can be applied by piezoelectric elements. In order to compensate this, the spring 30 or the spring assembly is provided for acting on the tool slide 4 and thus also on the piezo actuator 34 in the direction of a shortening of the piezo actuator 34. In so doing, the latter is supported on the supporting component 26 positioned on top in FIG. 1 and acts on the inner end face of the piezoelectric acceptance 36. When the piezo actuator 34 is expanded by appropriate control, the tool slide 4 is appropriately adjusted to the right in the representation according to FIGS. 1 and 2 against the force of the spring 30. In the case of opposed control, the piezo actuator 34 is shortened and the respective adjusting movement of the tool slide 4 is performed by the spring 30. As will be explained hereinafter, for increasing the stroke or the adjusting force plural piezo actuators 34 can be arranged in series and/or in parallel so that the actuating forces and/or the actuating travels add up. This is also true for the spring 30. The guideway of the tool slide 4 in the adjusting direction according to the invention enables an extremely precise advancing movement that allows for a sufficient adjusting rate due to the very good responsive behavior of the piezoelectric control even in the case of high spindle speeds so that also complex geometries can be machined with high cutting efficiency.

Figure 3:
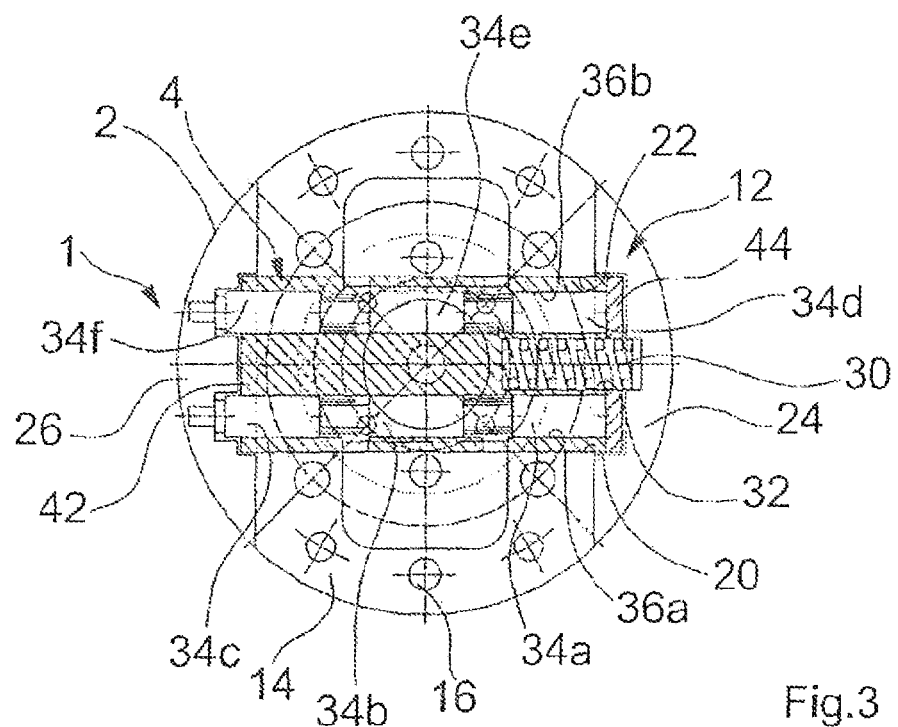
FIG. 3 shows a diagonal section across a further embodiment of a readjustment system.
Figure 4:
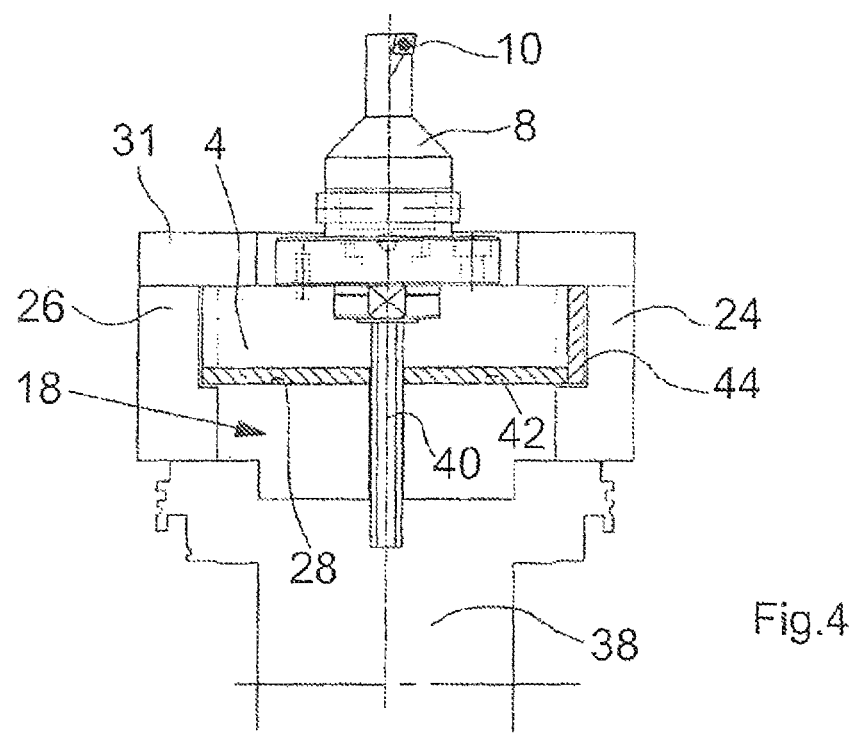
FIG. 4 shows a longitudinal section across the readjustment system according to FIG. 3
Figure 5:
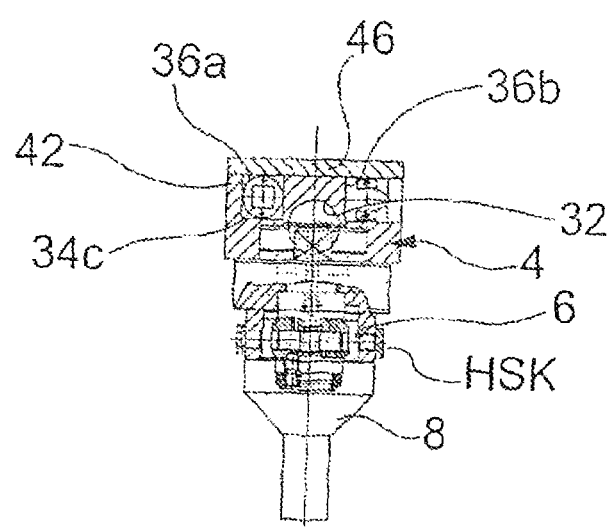
FIG. 5 is a cut top view onto the readjustment system according to FIG. 3.

By way of FIGS. 3 to 5, another embodiment of a readjustment system according to the invention is illustrated. The basic structure of the readjustment system 1 according to FIGS. 3 to 5 most largely corresponds to that of the afore-described embodiment. Accordingly, an advancing head 2 of the readjustment system 1 is connected via the mounting flange 14 for co-rotation with the tool spindle 38 indicated in FIG. 4, wherein an internal cooling or minimum lubricating system 40 by which the system can be cooled and lubricated is guided through, the tool spindle 38. The tool 8 is inserted, as in the afore-described embodiment, in the tool holder 6 via a HSK (hollow shank taper) clamping system (cf. FIG. 5). Said tool holder 6 is operatively connected with the tool slide 4 evident in FIG. 3 which is guided within the structure 12 adjustably in the advancing direction. Similarly to the afore-described embodiment, the tool slide 4 is guided in the advancing direction via two lateral guideways 20, 22. The adjusting travel is delimited by the supporting components 24 and 26 formed at or attached to the structure against which supporting components the tool slide 4 abuts at its respective end positions. The support in the axial direction of the tool spindle is effectuated via, the support 28 of the structure 12.

In this embodiment the modular tool slide 4 is configured to have two piezoelectric acceptances 36a, 36b in each of which plural piezo actuators 34a, 34b, 34c and 34d, 34e, 34f are successively arranged. Hence in the concrete embodiment three piezo actuators 34 at a time are arranged in the associated piezoelectric acceptance 36a, 36b so that, when all three piezo actuators 34 are controlled, the partial strokes thereof add up. The control can be designed so that the same voltage pulse acts on each of the piezo actuators. On principle, it is also possible to differently control the individual piezo actuators for setting the adjustment. The maximum stroke is determined in this case by the individual strokes of the three piezo actuators 34a, 34b, 34c and 34d, 34e, 34f. The maximum force is correspondingly determined by the number of the piezo actuators arranged in parallel so that the advancing stroke and also the advancing force are variable and finely adjustable to a comparatively great extent. Also in this embodiment the counterforce is applied by a spring 30 that is arranged in a plane of symmetry with respect to the two piezoelectric acceptances 36a, 36b in the representation according to FIG. 3. As is evident especially from the top view according to FIG. 5, the holding space 32 is offset toward the tool 8 vis-à-vis the two piezoelectric acceptances 36a, 36b. As is evident especially from the section in FIG. 3, the piezo actuators 34a, 34b, 34c and, resp., 34d, 34e, 34f are supported on the supporting component 26, whereas the spring 30 is in turn supported on the supporting component 24 located on the right in FIG. 3 and acts on the tool slide 4. In the shown embodiment a force of approx. 850 N can be applied in the direction of compression, i.e. in the direction of compressing the spring 30, by each of the piezo actuators so that the total force is resulting from the sum of the individual forces. The spring rate of the spring 30 then is appropriately selected so that during machining also a force effective in the direction of tension of the piezo actuators 34, i.e. in the direction of relief of the spring 30, can be applied.

As mentioned already, the tool slide 4 in this embodiment has a modular design with the piezoelectric acceptances 36a, 36b and the spring holder 32 being formed at a base member. The piezoelectric acceptances 36a, 36b are closed at the front side toward the supporting component 24 via a front wall 44. Toward the support 28 the tool slide 4 is configured to have a base plate 46 attached to a base member 42 and closing the piezoelectric acceptances 36a, 36b on the support side. The guideway of the tool slide 4 is covered by the cover 31 toward the working space.

Those skilled in the art infer from the embodiment according to FIGS. 3 to 5 that for varying the adjusting travel and/or the adjusting force the piezo actuators 34 can be appropriately arranged so as to add up the actuating forces and/or the actuating travels of the individual piezo elements.

As mentioned already, the direct adjustment of the tool slide 4 bearing the tool 8 in the adjusting direction considerably improves the precision vis-à-vis the solutions described in the beginning in which the adjustment is effectuated by elastic deflection of one leg of an advancing head.

The invention discloses a readjustment system comprising an advancing head, wherein a tool can be moved in an advancing direction via a tool slide. The tool slide is adjusted by means of at least one piezo actuator.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A readjustment system comprising an advancing head supporting a cutting edge configured to have at least one piezoelectric actuator for radially adjusting the cutting edge, characterized in that the advancing head includes a tool slide displaceable in the radial direction that is movable along a guideway in the radial direction for adjusting the cutting edge by means of the at least one piezoelectric actuator;
    wherein the guideway is delimited by a support of at least one counterforce element and also delimited by a second support for the at least one piezoelectric actuator;
    wherein the tool slide is biased in the direction of a home position via the counterforce element; and
    wherein the counterforce element is arranged approximately in parallel and overlaps an axial length of the piezoelectric actuator at the same time when in a static state.

2. The readjustment system according to claim 1, wherein the counterforce element is a spring or a spring assembly.

3. The readjustment system according to claim 1, wherein a plurality of piezoelectric actuators is arranged in parallel and/or in series.

4. The readjustment system according to claim 3, wherein at least two piezo actuator units each including at least two piezoelectric actuators arranged in series with respect to each other are arranged in parallel to each other.

5. The readjustment system according to claim 4, wherein the tool slide is biased in the direction of a home position via at least one counterforce element and the counterforce element is arranged approximately symmetrically in a plane between the two piezo actuator units.

6. The readjustment system according to claim 1, wherein the tool slide is biased in the direction of a home position via at least one counterforce element.

7. The readjustment system according to claim 1, wherein the guideway for the tool slide is covered toward a working space by a cover.

8. The readjustment system according to claim 1, wherein the advancing head comprises a HSK (hollow shank taper) clamping device for clamping a tool configured to include the cutting edge.

9. The readjustment system according to claim 1, wherein an effective direction of the piezoelectric actuator extends in the radial direction as advancing direction.

10. A readjustment system comprising an advancing head supporting a cutting edge configured to have at least one piezoelectric actuator for radially adjusting the cutting edge, characterized in that the advancing head includes a tool slide displaceable in the radial direction that is movable along a guideway in the radial direction for adjusting the cutting edge by means of the at least one piezoelectric actuator;
    wherein the guideway is delimited by a support of at least one counterforce element and also delimited by a support for the at least one piezoelectric actuator;
    wherein the tool slide is biased in the direction of a home position via the counterforce element; and
    wherein the piezoelectric actuator runs along the length of the counterforce element at the same time.

11. A readjustment system comprising an advancing head supporting a cutting edge configured to have at least one piezoelectric actuator for radially adjusting the cutting edge, characterized in that the advancing head includes a tool slide displaceable in the radial direction that is movable along a guideway in the radial direction for adjusting the cutting edge by means of the at least one piezoelectric actuator;

wherein the guideway runs along a length of the at least one piezoelectric actuator and a counterforce element and rotates about a common axis during expansion/contraction of the actuator, and wherein the at least one piezoelectric actuator and the counterforce element overlap in an axial direction; and wherein the tool slide is biased in the direction of a home position via the at least one counterforce element.

12. The readjustment system according to claim 4, wherein the at least two piezo actuator units each includes at least two piezoelectric actuators that are separately and independently controlled so that an advancing stroke and an advancing force are variable and finely adjustable.

13. The readjustment system according to claim 2, wherein the spring is arranged in a plane of symmetry with respect to two piezoelectric acceptances.

\* \* \* \* \*